United States Patent
Keoppel

(10) Patent No.: US 7,270,110 B2
(45) Date of Patent: Sep. 18, 2007

(54) FOUR STROKE INTERNAL COMBUSTION ENGINE WITH INLET AIR COMPRESSION CHAMBER

(76) Inventor: Frank Keoppel, 461 S. Downs Dr., Ogden, UT (US) 84404

( * ) Notice: Subject to any disclaimer, the term of this patent is extended or adjusted under 35 U.S.C. 154(b) by 0 days.

(21) Appl. No.: 11/314,159

(22) Filed: Dec. 21, 2005

(65) Prior Publication Data

US 2006/0169226 A1 Aug. 3, 2006

Related U.S. Application Data

(63) Continuation-in-part of application No. 10/396,297, filed on Mar. 25, 2003, now abandoned, which is a continuation-in-part of application No. 09/557,455, filed on Apr. 24, 2000, now Pat. No. 6,536,384.

(51) Int. Cl.
F02M 35/10 (2006.01)
(52) U.S. Cl. ..................... 123/317; 123/70 R
(58) Field of Classification Search ............. 123/317, 123/70 R
See application file for complete search history.

(56) References Cited

U.S. PATENT DOCUMENTS

| 3,672,172 A | 6/1972 | Hammond |
| 3,834,364 A | 9/1974 | Bartholomew |
| 4,248,185 A | 2/1981 | Jaulmes |
| 4,461,251 A * | 7/1984 | Sheaffer ...................... 123/317 |
| 4,558,671 A | 12/1985 | Stinebaugh |
| 4,598,673 A | 7/1986 | Poehlman |
| 5,005,537 A | 4/1991 | Maissant |
| 5,027,758 A | 7/1991 | Siegler |
| 5,033,418 A | 7/1991 | Maissant et al. |
| 5,062,396 A | 11/1991 | Duret et al. |
| 5,105,775 A | 4/1992 | Maissant |
| 5,154,141 A | 10/1992 | McWhorter |
| 5,230,314 A * | 7/1993 | Kawahara et al. .......... 123/317 |
| 5,279,269 A * | 1/1994 | Aizawa et al. .............. 123/317 |
| 5,291,866 A | 3/1994 | Kosa |
| 5,347,967 A | 9/1994 | Todero et al. |
| 5,403,164 A | 4/1995 | Gama |

(Continued)

FOREIGN PATENT DOCUMENTS

JP 57102519 A 6/1982

(Continued)

Primary Examiner—Stephen K. Cronin
Assistant Examiner—Jason Benton
(74) Attorney, Agent, or Firm—R. Reams Goodloe, Jr.

(57) ABSTRACT

A four-stroke engine with intake air compression chamber. The intake air compression chamber has a pressure responsive displaceable member therein to compress inlet air passively in response to differential pressure between a sealed crankcase and air in the inlet side of the inlet air compression chamber. The displaceable member is substantially impervious to air, oil, and fuel. When the piston moves away from the intake air compression chamber, decreasing pressure draws the displaceable member toward the crankcase, and the movement of the displaceable member draws into the intake side of the inlet air compression chamber through a one way inlet valve. When the piston moves toward the inlet air compression chamber, fluidwise, compressed gas in the crankcase causes increased pressure on the displaceable member, compressing the inlet air, and directing compressed inlet air out through a one-way outlet valve. Power in a four-stroke engine is increased without the necessity to employ superchargers or turbochargers.

37 Claims, 6 Drawing Sheets

U.S. PATENT DOCUMENTS

| | | |
|---|---|---|
| 5,490,482 A | 2/1996 | Genet |
| 5,526,778 A | 6/1996 | Springer |
| 5,579,735 A | 12/1996 | Todero et al. |
| 5,588,402 A | 12/1996 | Lawrence |
| 5,657,724 A | 8/1997 | Brown et al. |
| 5,678,525 A * | 10/1997 | Taue .................. 123/73 A |
| 5,682,845 A | 11/1997 | Woody |
| 5,752,477 A | 5/1998 | Dabadie |
| 5,771,849 A | 6/1998 | Hamy |
| 5,775,274 A | 7/1998 | Duret et al. |
| 5,809,949 A | 9/1998 | Duret |
| 6,055,959 A * | 5/2000 | Taue ..................... 123/317 |
| 6,167,874 B1 | 1/2001 | Becker et al. |
| 6,186,110 B1 | 2/2001 | Hamelink et al. |
| 6,513,466 B2 | 2/2003 | Bignion et al. |
| 6,536,384 B1 * | 3/2003 | Keoppel ................ 123/70 R |

FOREIGN PATENT DOCUMENTS

| | | |
|---|---|---|
| JP | 58085320 A | 5/1983 |
| JP | 60013968 A | 1/1985 |
| JP | 61093231 A | 5/1986 |
| JP | 63179130 A | 7/1988 |
| JP | 2231292 A | 9/1990 |
| JP | 7317547 A | 12/1995 |
| JP | 7317550 A | 12/1995 |
| JP | 7317551 A | 12/1995 |
| JP | 7317552 A | 12/1995 |

* cited by examiner

FOUR STROKE INTERNAL COMBUSTION ENGINE WITH INLET AIR COMPRESSION CHAMBER

RELATED PATENT APPLICATIONS

This patent application is a continuation-in-part of an claims priority under 35 USC Section 120 from prior U.S. patent application Ser. No. 10/396,297 filed on Mar. 25, 2003, now abandoned which is a continuation-in-part of and claims priority under 35 USC Section 120 from U.S. patent application Ser. No. 09/557,455 filed on Apr. 24, 2000, entitled Two-Stroke Internal Combustion Engine with Isolated Crankcase, now U.S. Pat. No. 6,536,384 B1, issued Mar. 25, 2003, the disclosures of each of which are incorporated herein in their entirety by this reference.

TECHNICAL FIELD

This invention relates to a internal combustion engines with inlet air compression, and more particularly to four-stroke engines with inlet air compression.

BACKGROUND

In conventional four-stroke internal combustion engines, techniques such as turbocharging (exhaust driven blower) or supercharging (power driven blower) have been advanced for achieving compression of the inlet air, in order to obtain more power. Although such techniques have been used for many years, they remain relatively expensive. And, in the case of turbocharging, heat resistant materials are necessary for the exhaust side, and such materials are available only at significant capital expense.

Consequently, there remains a significant and as yet unmet need for a four-stroke engine which provides a significant boost in power, but without the complexity and expense of heretofore known turbocharging or supercharging techniques.

SUMMARY

I have found that utilization of the pressure and vacuum cycles created within the substantially sealed crankcase of a four-stroke internal combustion can be utilized to passively force compressed air into a combustion chamber. A pressure responsive displaceable member, such as a flexible diaphragm, may be utilized to isolate the air that travels to the combustion chamber from the air within the crankcase. In such a design, no oil ever enters the combustion chamber from the substantially sealed crankcase. Thus, such a design may be called an isolated crankcase design.

As a piston moves upward in a cylinder and thus away from a substantially sealed crankcase, a moderate vacuum is created within the crankcase. The pressure responsive displaceable member is drawn toward the vacuum, in turn drawing inlet air into the inlet air compression chamber. This allows air (in a fuel injected system) or a mixture of fuel and air (in a carbureted system) to be drawn through a one-way inlet valve and into an inlet air compression chamber.

When the piston moves downward in a cylinder, toward the substantially sealed crankcase, gas pressure within the substantially sealed crankcase is increased, pushing the pressure responsive displaceable member away from the substantially sealed crankcase. Because the air, or the mixture of fuel and air on the inlet air side of the pressure responsive flexible member cannot escape through the one-way inlet air valve, or through a timed induction vent valve, the air (or mixture of fuel and air, if applicable) or pure air is forced out of the inlet air compression chamber through a one-way outlet valve, into an intake air plenum, and thence through an intake valve and into a cylinder, for compression and subsequent ignition and combustion.

In the just described design, air (or a fuel/air mixture) is pumped into the combustion chamber without ever being exposed to oil that lubricates the crankcase. In a four-stroke engine, the inlet air compression chamber design taught herein precludes oil from reaching the combustion chamber, thereby allowing oil to be used in a conventional manner to lubricate the crankcase.

In one embodiment, to avoid having pressure generated within the crankcase by any piston blow-by impeding the pumping action of the inlet air compression chamber, a timed valve is utilized to open (i.e., vent) the crankcase to the surrounding atmosphere at the time when the piston is at about its closest point of approach to the crankcase, i.e., the bottom dead center position of the piston.

In yet another embodiment, an intake air plenum, which receives compressed air from the inlet air compression chamber, can be provided with a pre-selected volume sufficient that, taking into account the engine displacement, the pressure variation within the intake air plenum will be minimized as the engine operates. Note that in order to increase the power output of a given size engine, the compressed inlet air generated during the power stroke of a four-stroke engine must be stored in an intake air plenum of sufficient size so that, when the compressed inlet air generated during the power stroke is combined with the compressed inlet air generated during the intake stroke, maximum advantage is created with respect to pressurization of air (or a fuel/air mixture) that is ultimately charged to the cylinder for combustion. Thus, in one embodiment, storage of compressed inlet air is accomplished during crankshaft rotation from about 360 degrees to about 540 degrees.

In general, in order to prevent a vacuum from being created in the area between a throttle and an intake valve at the cylinder head, the throttle may be located near the intake valve. In one design, a fuel injection nozzle may be located in the vicinity of the throttle.

Thus, it can be appreciated that the addition of an inlet air compression chamber in a manner that isolates the crankcase from the inlet air supplied to the combustion chamber enables a four-stroke engine to function efficiently, and with enhanced power, compared to conventional four-stroke engines. Therefore, the apparatus and methods disclosed herein represents an important improvement in the design for, and operation of, four-cycle engines.

BRIEF DESCRIPTION OF THE DRAWINGS

In order to enable the reader to attain a more complete appreciation of the invention, and of the novel features and the advantages thereof, attention is directed to the following detailed description when considered in connection with the accompanying drawings, wherein.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the four-stroke engine are also shown and briefly described to enable the reader to understand how various features may be utilized in order to provide an efficient, reliable engine.

DETAILED DESCRIPTION

Figure 1:
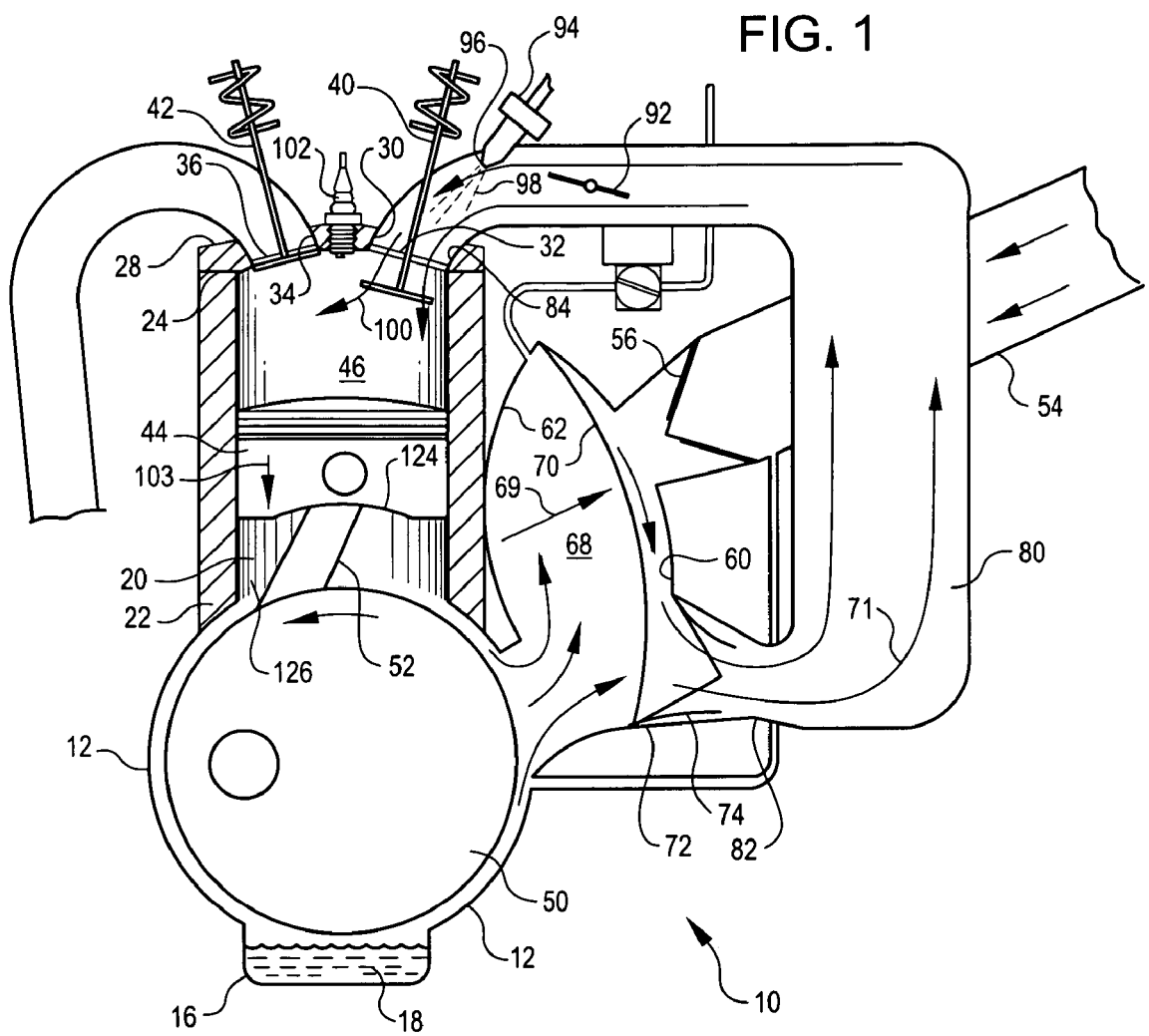
FIG. 1 illustrates a four-stroke engine with isolated crankcase during the intake stroke.

In FIG. 1, a diagrammatic view of one embodiment of an engine 10 with isolated and substantially sealed crankcase 12 is shown using an inlet air compression chamber 14. Generally, FIG. 1 illustrates the intake stroke of a four-cycle engine operating with a crankcase 12 isolated by an inlet air compression chamber 14. An oil reservoir 16 having oil 18 therein is provided at the lower reaches of crankcase 12. A cylinder 20 is provided, defined by a sidewall 22 extends outward or upward in this case from the crankcase 12 to an upper end portion 24. The cylinder 20 further includes, adjacent the upper end portion 24, a head 28. The head 28 head further includes an inlet 30 defined by inlet aperture walls 32 and an outlet 34 defined by outlet aperture walls 36. An intake valve 40 is schematically shown, operably disposed adjacent the inlet 30. An exhaust valve 42 is schematically shown operably disposed adjacent the outlet 34.

Figure 2:
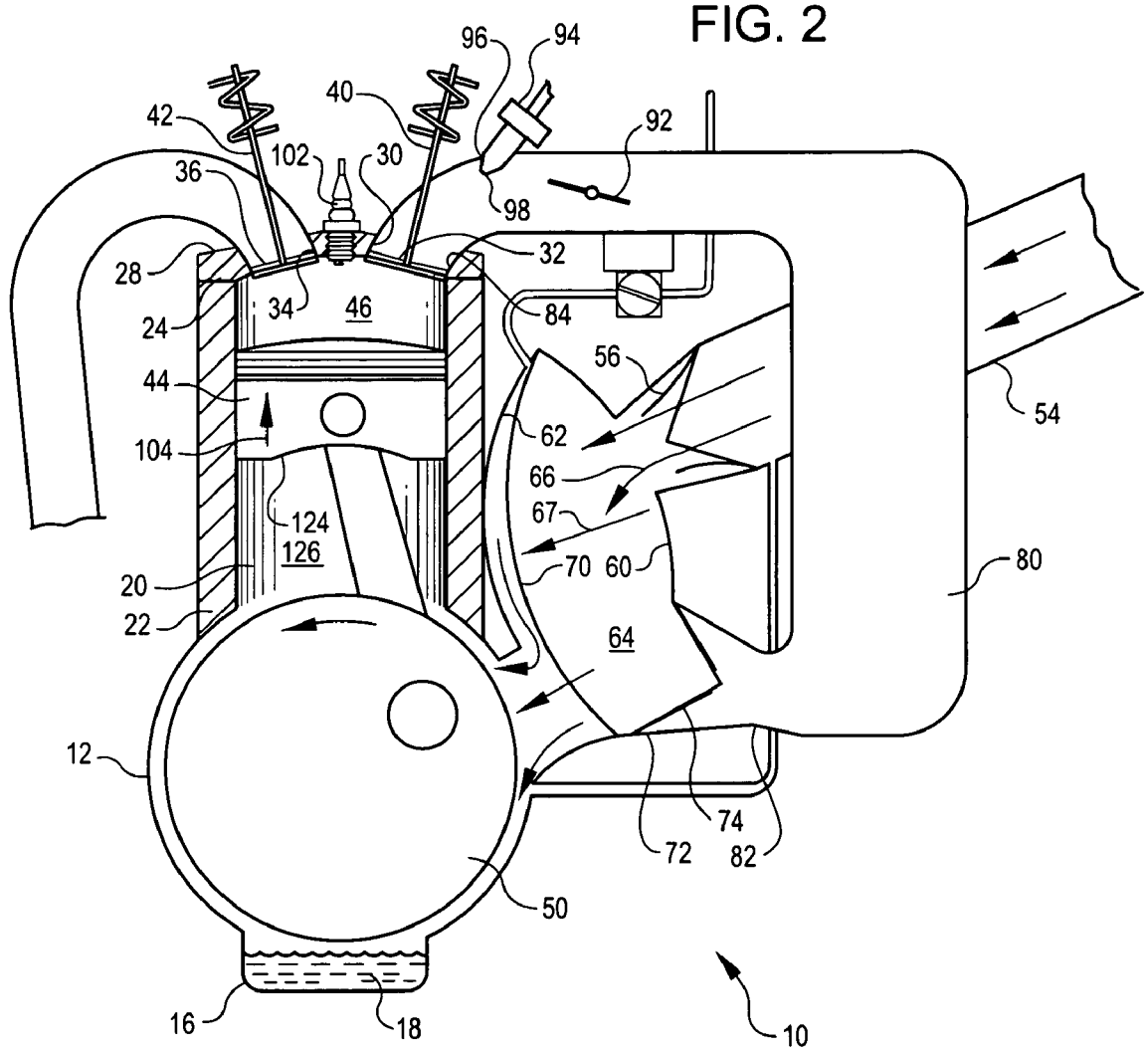
FIG. 2 illustrates a four-stroke engine with isolated crankcase during the compression stroke.

A piston 44 is provided slidably mounted in the cylinder 20. As best seen in FIG. 2, which depicts the compression stroke of a four-cycle engine, the piston 44 forms an upper compressible chamber 46 within the cylinder 20 between the piston 44 and the head 28. A crankshaft 50 is rotatably mounted in the substantially sealed crankcase 12. A connecting rod 52 is operatively mounted for translation of rotary motion of the crankshaft 50 into reciprocal motion of the piston 44.

An air inlet line 54 is provided to supply inlet air to the engine 10. The inlet air line 54 includes a one-way inlet only valve 56. The one way inlet valve 56 is disposed adjacent the inlet air compression chamber 14. The inlet air compression chamber 14 is fluidically disposed between the piston 44 and the inlet only valve 56. The inlet compression chamber 14 includes, in one embodiment, opposing sidewalls, namely inlet air sidewall 60 and crankcase sidewall 62, that define, in cooperation with flexible member 70 (further discussed below) an interior chamber 64 space for receiving inlet air 66 after it passes the inlet only valve 56, or alternatively, an engine side chamber 65 for receiving compressed gas 68 from the substantially sealed crankcase 12. Sealingly secured between the opposing inlet air sidewall 60 and the crankcase sidewall 62 is a displaceable member. In one embodiment, the displaceable member may be provided in the form of a flexible membrane 70. As better seen in FIG. 8, the flexible membrane 70 and the opposing sidewalls 60 and 62 may be juxtaposed in a manner wherein most of the interior chamber 64 and 65 space within the intake air compression chamber 14 is utilized when the flexible membrane 70 moves from full deflection during a fill with inlet air 66 as shown in solid lines in FIG. 8 (and reference arrows 67 in FIGS. 2 and 4), and to full deflection during discharge of compressed inlet air 71 as shown in broken lines in FIG. 8 (and reference arrows 69 in FIGS. 1 and 3). This range of motion is more generally shown in FIG. 8 by reference arrow 72.

Returning now to FIGS. 1 through 5, an intake air outlet line 72 is provided for discharge of compressed inlet air. An outlet only valve 74 is provided in the intake air outlet line 72. Upon discharge of the compressed air as shown by reference arrows 71 (in both FIGS. 1 and 8), it travels into an intake air plenum 80. The intake air plenum 80 has a plenum inlet 82 adjacent the outlet only valve 74. The intake air plenum 80 also has a plenum outlet 84 adjacent the inlet 30 of the head 28.

Overall, as shown in FIG. 1, movement of the piston 44 away from the head 28 in the direction of reference arrow 103 compresses gas 68 within the substantially sealed crankcase 12 against the displaceable member, shown as a flexible membrane 70. The displaceable member, here flexible membrane 70, responsively compresses inlet air 66 within the inlet air compression chamber until a threshold pressure is reached, whereupon the outlet only valve 74 opens, allowing compressed inlet air 71 to escape into the intake air plenum 80.

In the FIGS. 1 through 5, a throttle valve 92 is provided. The throttle valve 92 is operatively disposed in the intake air plenum 80 for movement to increase or decrease air flow through the intake air plenum 80. Further, a fuel injector 94, having a fuel outlet 96 situated in the intake air plenum 80 downstream of the throttle valve 92, is provided. The fuel injector 94 is operative to inject fuel 98 into compressed air in the intake air plenum 80, to create a fuel/air mixture 100. In one embodiment, the fuel injector 94 is located between the throttle 92 and the intake valve 40.

As shown in FIG. 1, during the intake cycle, the intake valve 40 is operatively configured to open, wherein upon opening of the intake valve 40, the fuel/air mixture 100 escapes into the upper compressible chamber 46. Alternately, a carburetor may be provided upstream in inlet air line 54, and as will known to those of ordinary skill in the art without further explanation, operatively configured to provide a fuel/air mixture (not shown) to the intake air plenum 80, via said inlet air line 54 and the inlet air compression chamber 14.

A spark plug 102 may be provided for each cylinder 20. The spark plug 102, operatively connected to an ignition electrical system, provides ignition energy for igniting the fuel air mixture 100 in the upper compressible chamber 46. A depicted in FIGS. 1 through 4, conventional four-cycle engine operation is feasible when using the inlet air compression chamber 14 as taught herein. FIG. 1 depicts the engine 10 when in the intake cycle, with the intake valve 40 open, so the fuel/air mixture 100 can be moved into the upper compressible chamber 46. The piston 44 is moving in the direction of reference arrow 103. FIG. 2 depicts the engine 10 in the compression cycle, with both the intake valve 40 and the exhaust valve 42 closed. In this cycle, the piston 44 is moving towards head 28 in the direction of reference arrow 104.

Figure 3:
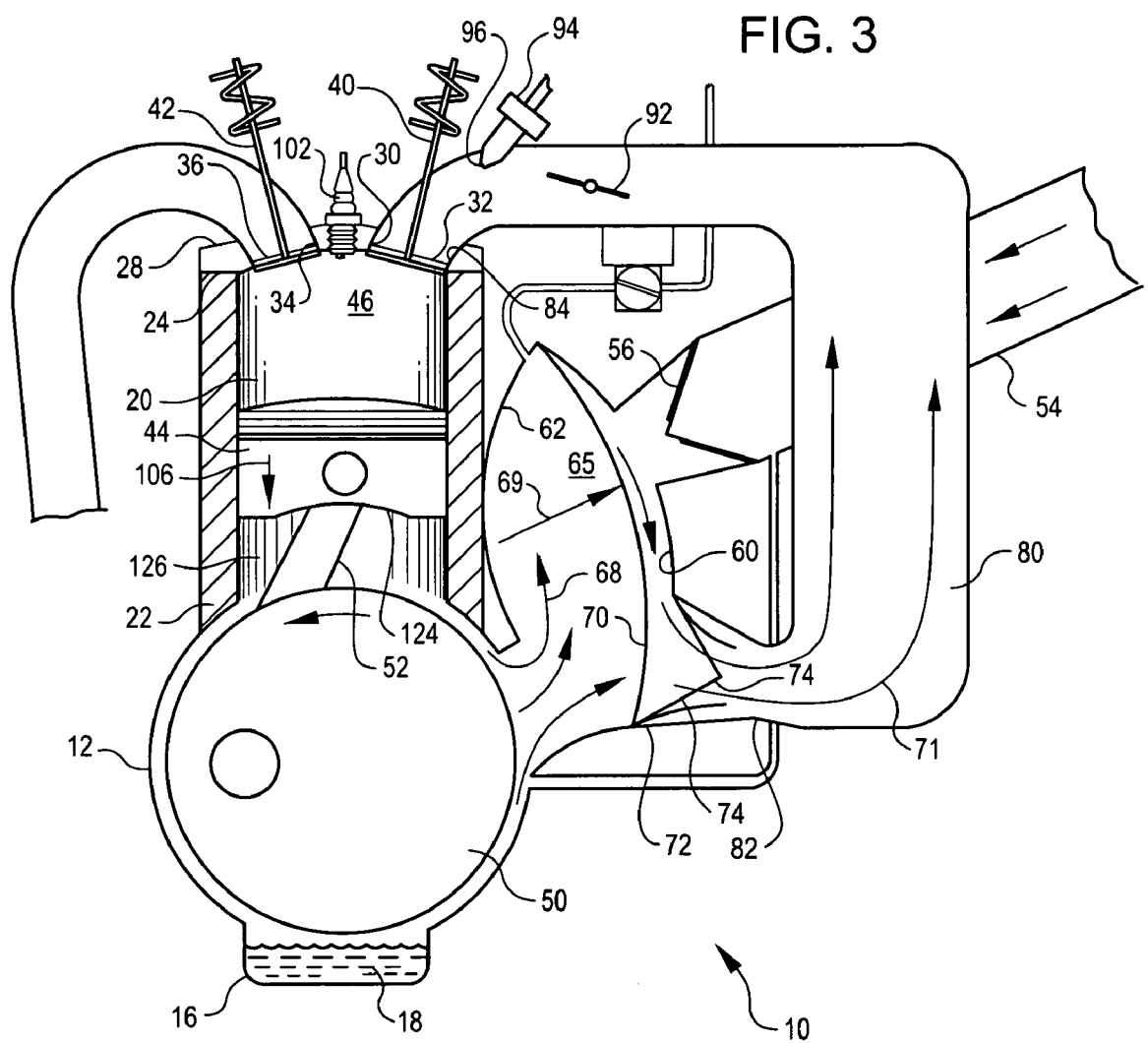
FIG. 3 illustrates a four-stroke engine with isolated crankcase during the power stroke.
Figure 4:
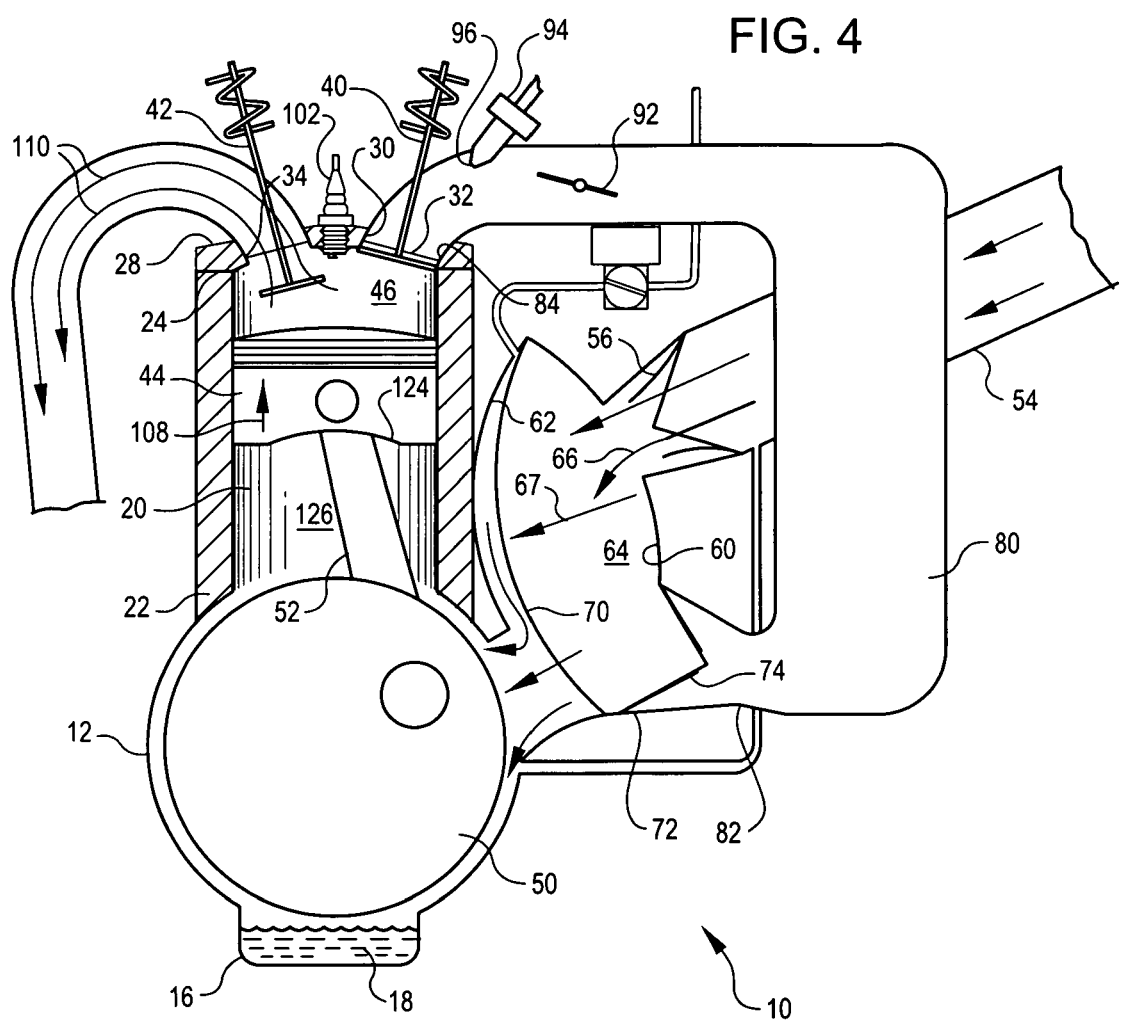
FIG. 4 illustrates a four-stroke engine with isolated crankcase during the exhaust stroke.

In FIG. 3, a power stroke is illustrated. Here, after combustion of the fuel/air mixture in upper compression chamber 46, the piston 44 moves in the direction of reference arrow 106. Compressed inlet air is moved, as shown by reference arrow 71, from inlet compression chamber 14 and into the intake air plenum 80, for temporary storage. Finally, in FIG. 4, an exhaust stroke is illustrated. Here, the piston 44 moves in the direction of reference arrow 108. The exhaust valve 42 is open, allowing combustion gases 110 to escape from the cylinder 20.

Figure 5:
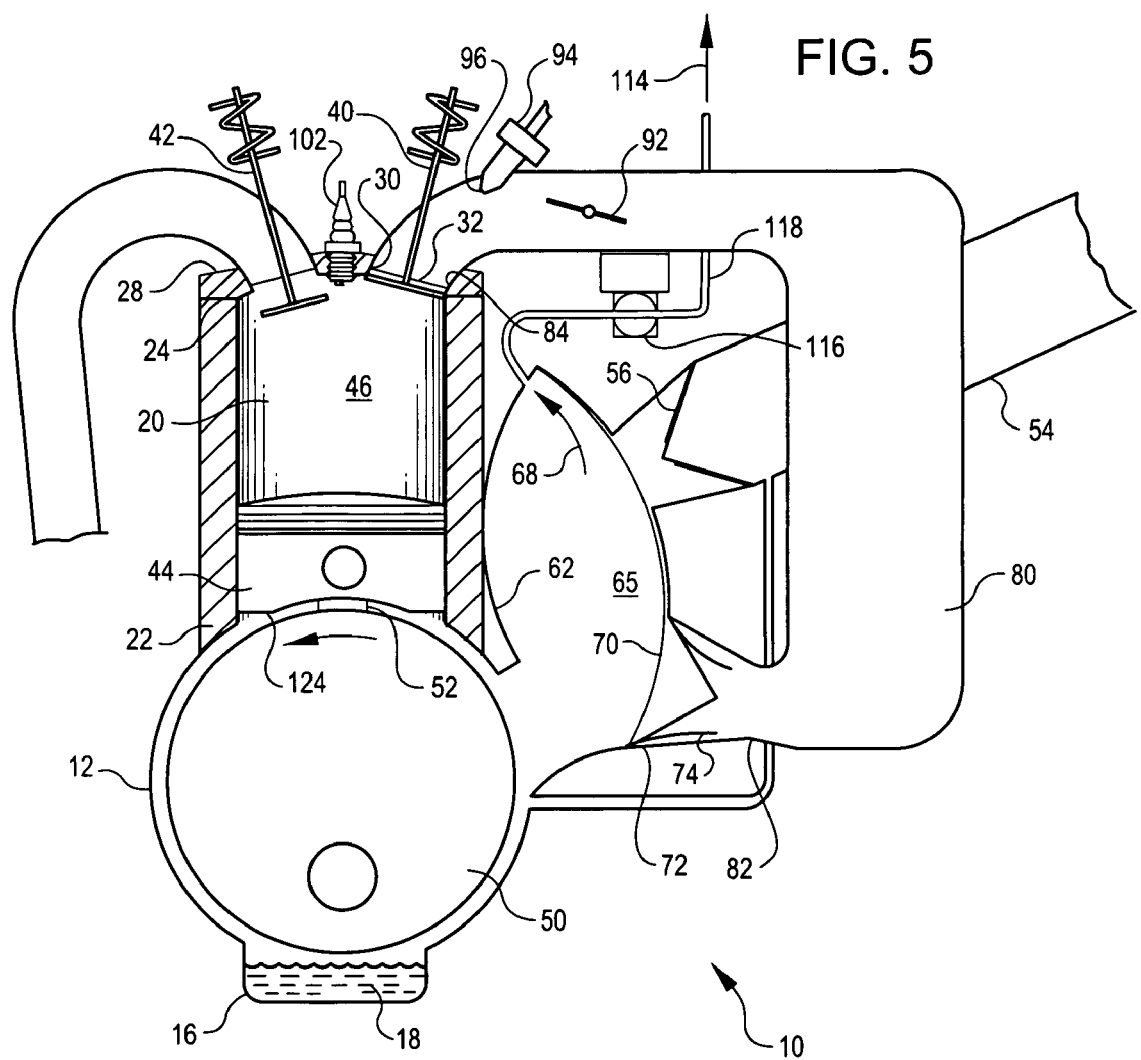
FIG. 5 illustrates a four-stroke engine with isolated crankcase when the piston is at bottom dead center, showing the use of a timed crankcase valve to vent the crankcase before the exhaust stroke starts.

Turning now to a comparison of FIGS. 1 and 5, in an embodiment, it may be advantageous to provide, on the substantially sealed crankcase side of the displaceable member (flexible membrane 70), a vent 112. The vent 112 is operatively configured to provide fluid communication between the substantially sealed crankcase side 68 of the inlet air compression chamber 14 and the surrounding environment 114. As shown in FIG. 5, the vent 112 may include a vent valve 116 and a vent exit line 118. It is useful to provide a vent exit line 118 (and vent line 112, before the vent valve 116) in the form of a fluid conductor having a cross-sectional area sufficiently large so that when gas 68 within the substantially sealed crankcase 12 is discharged, that the vent valve 116 is closeable sufficiently quickly so that air from the surrounding environment 114 is not permitted to substantially enter the substantially sealed crankcase 12 through the vent line 118. In one embodiment, a timed crankcase valve may be utilized for vent valve 116. As depicted in FIG. 5, the timed crankcase valve may be operably configured to open the substantially sealed crankcase 12 to the surrounding environment 114 when the piston 44 is approximately at a bottom dead center position. At other times, as shown in FIGS. 1-4, the vent valve 115 is normally closed.

Figure 6:
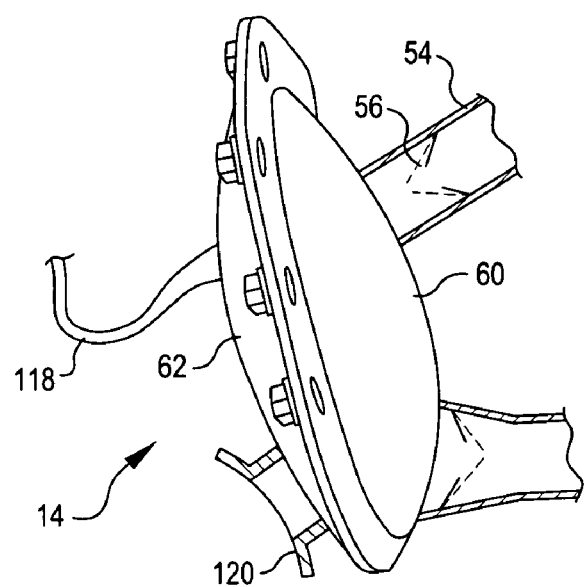
FIG. 6 provides a side perspective view of an embodiment for an air inlet compression chamber.
Figure 7:
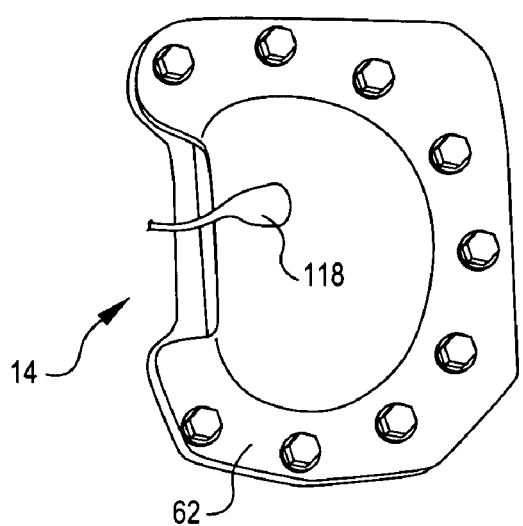
FIG. 7 provides a back perspective view of one embodiment for an air inlet compression chamber for isolation of an engine crankcase.
Figure 8:
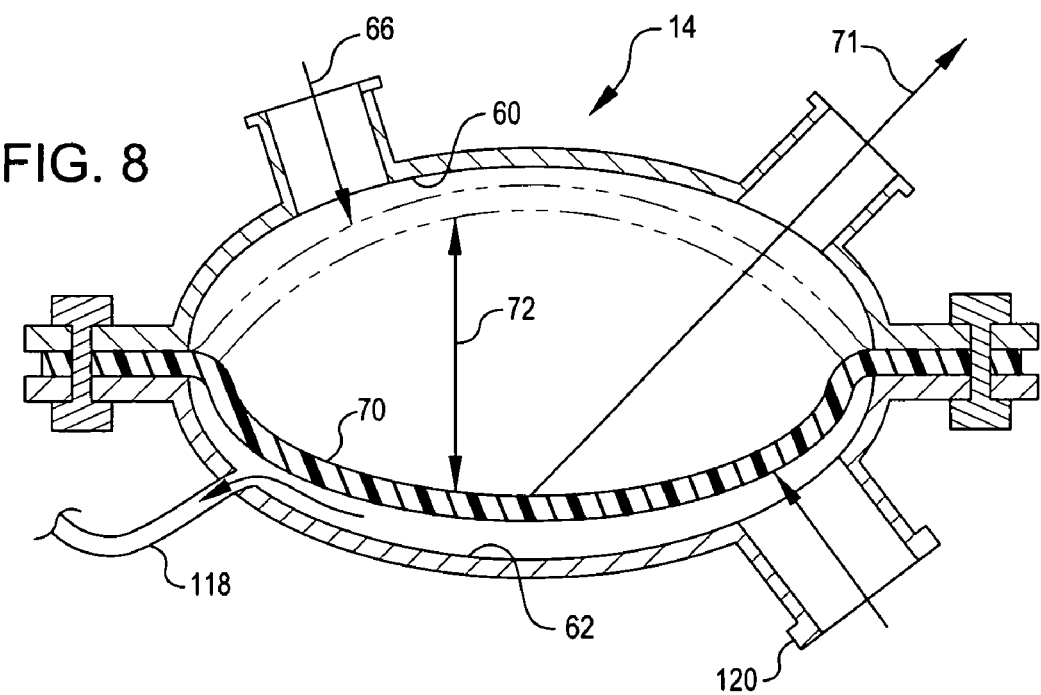
FIG. 8 illustrates a cross-sectional view of one embodiment for an inlet air compression chamber for isolation of a crankcase.

As more clearly seen in FIGS. 6 and 8, the inlet air compression chamber 14 may be affixed to the substantially sealed crankcase 12 via an activation passageway 120. And, although noted above, it is more clearly evident in FIGS. 6 and 8 that in one embodiment, the inlet air compression chamber 14 may be provided with opposing concave sidewalls 60 and 62 arranged to define an interior space therebetween. Generally, in one embodiment, the inlet air compression chamber 14 may be provided with a generally hollow chamber interior space having inner surfaces, defined by the sidewalls 60 and 62. In one embodiment, the flexible membrane 70 may be a flexible diaphragm that is provided in a material substantially impervious to oil Also, in one embodiment, the flexible membrane 70 may be a flexible diaphragm that is provided in a material that is substantially impervious to air.

For further clarity, one way to visualize certain components of the apparatus described herein for compression of inlet air is to note that the piston 44 includes, in some fashion, a lower sealing wall 124. The cylinder 20 sidewalls 22, below a then operable location of the lower sealing wall 124, cooperate with the substantially sealed crankcase 12, (c) the crankcase side of the inlet air compression chamber 14, and (d) the displaceable member such as a flexible membrane 70 within the inlet air compression chamber 12, to form a lower compressible chamber 126. Thus, the lower compressible chamber 126 contains the compressed gas 68 during movement of the piston 44 toward the substantially sealed crankcase 12. In one embodiment, the inlet air compression chamber 14 may be considered to be fluidically disposed between the substantially sealed crankcase 12 and the inlet only valve 56. In such an embodiment, the inlet air compression chamber 14 includes (a) a crankcase side interior sidewall 62 and an inlet air side interior sidewall 60, and (b) a flexible membrane 70 sealingly affixed between the crankcase side interior sidewall and the inlet air side interior sidewall for motion cyclically toward and away from each of the crankcase side interior sidewall 62 and the inlet air side interior sidewall 60.

Overall, use of the inlet air compression chamber will provide power improvements over an equivalent four-stroke engine without addition of an inlet air compression chamber 12. The precise power advantage will depend upon a variety of factors.

Having described the various components for an advantageous apparatus for compression of inlet air in a four stroke internal combustion engine, the process of operation will be further explained. An inlet air compression chamber 14 is provided, located between an air inlet 54 and a sealed crankcase 12. The air inlet 54 includes an inlet only valve 56 adjacent the inlet air compression chamber 14. The inlet air compression chamber 14 comprises an inlet air side and a crankcase side with a displaceable member 70 secured therebetween. The displaceable member 70 is passively responsive to differential pressure between said sealed crankcase 12 and said inlet air side 64 of said inlet air compression chamber 14. Air 66 in the inlet side 64 of the inlet air compression chamber 14 is compressed during an intake stroke of a piston 44. The compressed air is discharged from the inlet air compression chamber 14 through an outlet only valve 74. When fuel injection is utilized, fuel is added to the compressed inlet air to form a compressed air/fuel mixture 100. The compressed fuel/air mixture is injected into upper compressible chamber 46 within cylinder 20. The fuel/air mixture 100 is further compressed in response to upward movement of the piston 44 during a compression stroke, to provide a compressed combustible fuel/air mixture. Then, the compressed combustible fuel/air mixture is ignited by a spark plug. The engine is timed for four cycle engine operation. In one embodiment, the process comprises storing, in the intake air plenum, the inlet air compressed in the inlet air compression chamber during a downward stroke of a piston, when the down stroke occurs during a power stroke of the four stroke combustion engine. Further optimization can be achieved by providing an inlet air plenum shaped and sized to for optimum operation by minimizing pressure variation in the inlet air plenum 80 while maximizing the pressure of compressed air provided for injection into the upper compression chamber 46.

It should also be noted, and those of ordinary skill in the art and to whom this specification is addressed will appreciate that an engine utilizing a carburetor may, instead of providing a fuel/air mixture to the inlet air line 54, may leave the inlet air line 54 free of fuel, and provide a fuel/air mixture in the vicinity of the outlet 84 of the intake air plenum 80, or upstream therefrom to the vicinity of the throttle 92. Also, such persons will appreciate that the "one-way" valves 56 and 74 have been depicted as reed type valves, other valves types or designs may provide the necessary unidirectional flow, such as timed rotary valves, or other actuated valves which operatively block fluid backflow.

It is to be appreciated that various aspects and embodiments of the engine designs described herein are an important improvement in the state of the art of four-cycle engines. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. An internal combustion engine with gas compressing crankcase, comprising:
   a substantially sealed crankcase;
   a cylinder, the cylinder comprising a sidewall extending outward from the crankcase to an upper end portion, the cylinder further comprising, adjacent the upper end portion, a head, the head further comprising an inlet defined by inlet aperture walls and an outlet defined by outlet aperture wall;
   an intake valve, said intake valve operably disposed adjacent said inlet;
   an exhaust valve, said exhaust valve operably disposed adjacent said outlet;
   a piston, the piston slidably mounted in the cylinder, forming an upper compressible chamber within the cylinder between the piston and the head;
   a crankshaft rotatably mounted in the substantially sealed crankcase;
   a connecting rod operatively mounted for translation of rotary motion of the crankshaft into reciprocal motion of the piston;
   an air inlet line, said inlet air line further comprising an inlet only valve;
   an inlet air compression chamber, the inlet air compression chamber fluidically disposed between said piston and said inlet only valve, said inlet air compression chamber comprising a pressure responsive displacable member;
   an intake air outlet line, said intake air outlet line further comprising an outlet only valve;
   an intake air plenum, said intake air plenum having a plenum inlet adjacent said outlet only valve and a plenum outlet adjacent the inlet of the head;
   wherein movement of the piston away from the head compresses gas within said substantially sealed crankcase against said displaceable member, said displaceable member responsively compressing inlet air within said inlet air compression chamber until a threshold pressure is reached, whereupon said outlet only valve opens, allowing compressed inlet air to escape into said intake air plenum.

2. The engine as set forth in claim 1, further comprising a throttle valve, said throttle valve operably disposed in said intake air plenum for movement to increase or decrease air flow through the intake air plenum.

3. The engine as set forth in claim 2, further comprising a fuel injector, said fuel injector comprising a fuel outlet situated in said intake air plenum downstream of said throttle valve, said fuel injector operative to inject fuel into compressed air in the intake air plenum, to create a fuel/air mixture.

4. The engine as set forth in claim 3, wherein said intake valve is operatively configured to open and close, and wherein upon opening of the intake valve, fuel/air mixture escapes into the upper compressible chamber.

5. The engine as set forth in claim 1, further comprising a carburetor, said carburetor operatively configured to provide a fuel/air mixture to said upper compression chamber.

6. The engine as set forth in claim 4, further comprising a spark plug, the spark plug providing ignition energy for igniting the fuel air mixture in the upper compressible chamber.

7. The engine as set forth in claim 1 or in claim 6, wherein said engine is operatively configured for four-cycle operation.

8. The engine as set forth in claim 1 wherein said one way inlet valve is disposed adjacent the inlet air compression chamber.

9. The engine as set forth in claim 1, further comprising, on the substantially sealed crankcase side of said displaceable member, a vent, said vent providing fluid communication between the substantially sealed crankcase side of said inlet air compression chamber and the surrounding environment.

10. The engine as set forth in claim 9, wherein said vent comprises a vent valve and a vent line.

11. The engine as set forth in claim 10, wherein said vent line comprises a fluid conductor having a cross sectional area sufficiently large so that when gas within said substantially sealed crankcase is discharged and said vent valve is closeable sufficiently quickly so that air is not permitted to substantially enter said substantially sealed crankcase through said vent line.

12. The engine as set forth in claim 10, wherein said vent valve comprises a timed crankcase valve.

13. The engine as set forth in claim 12, wherein said timed crankcase valve is operably configured to open the substantially sealed crankcase to the surrounding environment when the piston is approximately at a bottom dead center position.

14. The engine as set forth in claim 1, further comprising a throttle, said throttle located near said intake valve, and a fuel injector, said fuel injector located between said throttle and said intake valve.

15. The engine as set forth in claim 1, wherein said inlet air compression chamber is affixed to said substantially sealed crankcase via an activation passageway.

16. The engine as set forth in claim 1, wherein said inlet air compression chamber comprises opposing concave sidewalls arranged to define an interior space.

17. The engine as set forth in claim 16, wherein the displaceable member comprises a flexible membrane sealingly secured between said opposing concave sidewalls.

18. The engine as set forth in claim 17, wherein said flexible membrane and said opposing sidewalls are juxtaposed in a manner wherein most of the interior space within said intake air compression chamber is utilized when the flexible membrane moves from full deflection during a fill with inlet air, and to full deflection during discharge of compressed inlet air.

19. The engine as set forth in claim 1, wherein power output from the engine is increased, using the inlet air compression chamber, in the range of up to 40% over an equivalent four-stroke engine without addition of an inlet air compression chamber.

20. The engine as set forth in claim 1, wherein said inlet air compression chamber comprises a generally hollow chamber having inner surfaces.

21. The engine as set forth in claim 20, wherein said displaceable member comprises a flexible diaphragm disposed between said inner surfaces.

22. The engine as set forth in claim 21, wherein said flexible diaphragm comprises a material substantially impervious to oil.

23. The engine as set forth in claim 21, wherein said flexible diaphragm comprises a material substantially impervious to air.

24. The engine as set forth in claim 1, wherein the piston comprises a lower sealing wall, and wherein (a) the cylinder sidewalls below an operable location of the lower sealing wall, (b) the substantially sealed crankcase, and (c) the crankcase side of the inlet air compression chamber, and (d) the displaceable member within the inlet air compression chamber, form a lower compressible chamber, the lower compressible chamber containing compressed gas during downward movement of the piston.

25. An internal combustion engine with gas compressing crankcase, comprising:
a substantially sealed crankcase;
a cylinder, the cylinder comprising a sidewall extending outward from the crankcase to an upper end portion, the cylinder further comprising, adjacent the upper end portion, a head, the head further comprising an inlet defined by inlet aperture walls and an outlet defined by outlet aperture walls;
an intake valve, said intake valve operably disposed adjacent said inlet;
an exhaust valve, said exhaust valve operably disposed adjacent said outlet;
a piston, the piston slidably mounted in the cylinder, forming an upper compressible chamber within the cylinder between the piston and the head;
a crankshaft rotatably mounted in the substantially sealed crankcase;
a connecting rod operatively mounted for translation of rotary motion of the crankshaft into reciprocal motion of the piston;
an air inlet line, said inlet air line further comprising an inlet only valve;
an inlet air compression chamber, the inlet air compression chamber fluidically disposed between the substantially sealed crankcase and the inlet only valve, said inlet air compression chamber comprising (a) a crankcase side interior sidewall and an inlet air side interior sidewall, and (b) a flexible membrane sealingly affixed between the crankcase side interior sidewall and the inlet air side interior sidewall for motion cyclically toward and away from each of the crankcase side interior sidewall and the inlet air side interior sidewall;
an intake air outlet line, said intake air outlet line further comprising an outlet only valve;
an intake air plenum, said intake air plenum having a plenum inlet adjacent said outlet only valve and a plenum outlet adjacent the inlet of the head;
wherein movement of the piston away from the head compresses gas within said substantially sealed crankcase against the flexible membrane, the flexible membrane responsively compressing inlet air within said inlet air compression chamber, whereupon said outlet only valve opens, allowing compressed inlet air to escape into said intake air plenum.

26. The engine as set forth in claim 25, further comprising a throttle valve, said throttle valve operably disposed in said intake air plenum for movement to increase or decrease air flow through the intake air plenum.

27. The engine as set forth in claim 26, further comprising a fuel injector, said fuel injector comprising a fuel outlet situated in said intake air plenum downstream of said throttle valve, said fuel injector operative to inject fuel into compressed air in the intake air plenum, to create a fuel/air mixture.

28. The engine as set forth in claim 27, wherein said intake valve is operatively configured to open and close, and wherein upon opening of the intake valve, fuel/air mixture escapes into the upper compressible chamber.

29. The engine as set forth in claim 28, further comprising a spark plug, the spark plug providing ignition energy for igniting the fuel air mixture in the upper compressible chamber.

30. The engine as set forth in claim 25, wherein said engine is operatively configured for four-cycle operation.

31. The engine as set forth in claim 25, further comprising, on the substantially sealed crankcase side of said displaceable member, a vent, said vent providing fluid communication between the substantially sealed crankcase side of said inlet air compression chamber and the surrounding environment.

32. The engine as set forth in claim 25, wherein the flexible membrane comprises a material substantially impervious to oil.

33. The engine as set forth in claim 25, wherein said flexible membrane comprises a material substantially impervious to air.

34. The engine as set forth in claim 25, wherein the piston comprises a lower sealing wall, and wherein (a) the cylinder sidewalls below an operable location of the lower sealing wall, (b) the substantially sealed crankcase, and (c) the crankcase side of the inlet air compression chamber, and (d) the flexible membrane within the inlet air compression chamber, form a lower compressible chamber, the lower compressible chamber containing compressed gas during downward movement of the piston.

35. A process of operation of a four-stroke internal combustion engine, said process comprising:
providing an inlet air compression chamber located between an air inlet and a sealed crankcase, said air inlet having an inlet only valve adjacent the inlet air compression chamber, and wherein said inlet air compression chamber comprises an inlet air side and a crankcase side with a displaceable member secured therebetween, and wherein the displaceable member is passively responsive to differential pressure between said sealed crankcase and said inlet air side of said inlet air compression chamber;
compressing air in said inlet air compression chamber during a down stroke of a piston;
discharging said compressed inlet air from the inlet air compression chamber through an outlet only valve;
adding fuel to said compressed inlet air to form a compressed air/fuel mixture;
injecting compressed air/fuel mixture into said cylinder;
further compressing said compressed inlet air/fuel mixture in response to upward movement of said piston, to provide a combustible fuel/air mixture;
igniting said combustible fuel/air mixture;
timing said engine for four stroke cycle operation.

36. The process as set forth in claim 35, wherein said process comprises storing the inlet air compressed in the compression chamber during a down stroke of a piston in the intake air plenum, when the down stroke occurs during a power stroke of the four stroke combustion engine.

37. The process as set forth in claim 36, wherein the process further comprises providing an inlet air plenum shaped and sized to for optimum operation by minimizing pressure variation in the inlet air plenum while maximizing the pressure of compressed air provided for injection into the upper compression chamber.

* * * * *

UNITED STATES PATENT AND TRADEMARK OFFICE
CERTIFICATE OF CORRECTION

PATENT NO.         : 7,270,110 B2                                    Page 1 of 1
APPLICATION NO. : 11/314159
DATED              : September 18, 2007
INVENTOR(S)        : Frank Keoppel It is certified that error appears in the above-identified patent and that said Letters Patent is hereby corrected as shown below:

IN THE SPECIFICATION:

Column 1, line 7, after the word "of", delete "an" and substitute therefore --and--.
       Column 1, line 20, after the words "relates to" delete "a".
       Column 1, line 45, after the word "combustion", insert --engine--.
       Column 4, line 46, after the words "and as" delete "will" and substitute therefore --well--.
       Column 5, line 45, after the words "impervious to oil", insert --.--.

IN THE CLAIMS:

Column 7, line 27, delete "wall" and substitute therefore --walls--.
       Column 12, line 1, after the words "and sized", delete "to".
       Column 12, line 4, delete the word "upper".

Signed and Sealed this

Thirty-first Day of August, 2010

David J. Kappos
*Director of the United States Patent and Trademark Office*